(12) United States Patent
Mizuno

(10) Patent No.: US 10,263,527 B1
(45) Date of Patent: Apr. 16, 2019

(54) POWER CONVERTER

(71) Applicant: Mitsubishi Electric Corporation, Tokyo (JP)

(72) Inventor: Takahiro Mizuno, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/964,494

(22) Filed: Apr. 27, 2018

(30) Foreign Application Priority Data

Oct. 31, 2017 (JP) ................. 2017-210032

(51) Int. Cl.
*H02M 3/156* (2006.01)
*H02M 3/335* (2006.01)
*H02H 7/12* (2006.01)

(52) U.S. Cl.
CPC .............. *H02M 3/335* (2013.01); *H02H 7/12* (2013.01); *H02M 3/156* (2013.01)

(58) Field of Classification Search
CPC ...... H02M 3/156; H02M 3/1563; H02M 1/32; H02M 2001/325
USPC .................................. 323/282–285; 363/50
See application file for complete search history.

(56) References Cited

U.S. PATENT DOCUMENTS

| 2005/0088159 A1* | 4/2005 | Itohara | H02M 3/156 323/284 |
|---|---|---|---|
| 2009/0184700 A1* | 7/2009 | Kanayama | H02M 3/158 323/282 |
| 2011/0133711 A1* | 6/2011 | Murakami | H03K 17/0822 323/282 |
| 2011/0175587 A1* | 7/2011 | Hosotani | H02M 3/33515 323/283 |
| 2013/0114175 A1* | 5/2013 | Song | H02M 1/32 361/86 |
| 2016/0268902 A1* | 9/2016 | Yamaguchi | H02M 1/32 |

FOREIGN PATENT DOCUMENTS

| JP | 9-224329 A | 8/1997 |
|---|---|---|
| JP | 10-108457 A | 4/1998 |

OTHER PUBLICATIONS

Communication dated Oct. 23, 2018, issued by the Japanese Patent Office in counterpart Japanese application No. 2017-210032, 7 pages with translation.

* cited by examiner

*Primary Examiner* — Alex Torres-Rivera
(74) *Attorney, Agent, or Firm* — Sughrue Mion, PLLC; Richard C. Turner

(57) ABSTRACT

To provide a power converter not to stop a DC power conversion of the power converter, when there is no abnormality in the main circuit of the power converter, and the command signal of output voltage has an abnormality. A power conversion circuit is provided with a voltage command upper limit circuit that upper-limits the voltage signal which is inputted to the switching control circuit by a preliminarily set upper limit voltage, wherein the voltage command upper limit circuit is provided with a Zener diode or a shunt regulator, wherein the Zener diode or the shunt regulator upper-limits the voltage signal by an upper limit voltage corresponding to Zener voltage or shunt voltage, and wherein a voltage command represented by the upper limit voltage is set to a voltage less than the protection determination voltage of the output overvoltage protection circuit.

2 Claims, 2 Drawing Sheets

POWER CONVERTER

INCORPORATION BY REFERENCE

The disclosure of Japanese Patent Application No. 2017-210032 filed on Oct. 31, 2017 including its specification, claims and drawings, is incorporated herein by reference in its entirety.

BACKGROUND

The present disclosure relates to a power converter having an output overvoltage preventing function.

Conventionally, the power converter generally has a protection function against overvoltage state of output voltage. For example, JP H10-108457 A explains the mechanism that protects from the overvoltage state by shutting down switching control, in the case of the output overvoltage state.

SUMMARY

In the technology of JP H10-108457 A, in order to protect the electric load connected to the output terminal from overvoltage failure when the output voltage becomes overvoltage, the overvoltage protection function is provided. Although JP H10-108457 A does not disclose a configuration which makes output voltage variable, there is also a configuration which makes output voltage variable, depending on usage of a power converter. In the power converter which makes output voltage variable, a signal which represents a voltage command of output voltage is transmitted from outside, and output voltage is adjusted based on this signal.

The overvoltage protection function of the power converter mainly assumes protection when some fault occurs in the main circuit of the power converter. However, if the overvoltage state of the output voltage is caused by the overvoltage of the command signal of output voltage, even though there is no failure in the main circuit of the power converter, the output overvoltage protection circuit detects the output overvoltage state of the power converter, and stops the function of the power converter.

Especially, for on-vehicle apparatus, the requirement for safety is high (for example, ISO26262 automotive functional safety standard and the like), even if the output overvoltage protection circuit is mounted, it is required to design so that the output voltage of the power converter may not be in the overvoltage state as much as possible, when the function of the output overvoltage protection circuit fails.

Thus, it is desired to provide a power converter not to stop the DC power conversion of the power converter, when there is no abnormality in the main circuit of the power converter, and the command signal of output voltage inputted into the power converter has an abnormality; and to provide a power converter capable of preventing the output voltage from being in the output overvoltage state, without depending on the output overvoltage protection circuit, when the command signal of output voltage has an abnormality.

A power converter according to the present disclosure includes:

a power conversion circuit provided with a switching device for converting DC power from an input terminal to an output terminal;

a switching control circuit that controls on/off of the switching device so that a DC voltage of the output terminal approaches a voltage command represented by an voltage signal which was inputted to the switching control circuit;

an output overvoltage protection circuit that transmits an output inhibition command signal for commanding stop of DC power conversion to the switching control circuit, when the DC voltage of the output terminal exceeds a preliminarily set protection determination voltage; and a voltage command upper limit circuit that upper-limits the voltage signal which is inputted to the switching control circuit by a preliminarily set upper limit voltage, wherein the voltage command upper limit circuit is provided with a Zener diode or a shunt regulator, which is connected between a ground and a voltage command signal wire which is a wire inputting the voltage signal to the switching control circuit, wherein the Zener diode or the shunt regulator upper-limits the voltage signal which is inputted to the switching control circuit by the upper limit voltage corresponding to a Zener voltage or a shunt voltage, and wherein the voltage command represented by the upper limit voltage is set to a voltage less than the protection determination voltage.

According to the power converter of the present disclosure, when the voltage command voltage signal becomes excessive due to power short-circuit failure and the like, the voltage command voltage signal is upper-limited to the upper limit voltage corresponding to the Zener voltage or the shunt voltage by the Zener diode or the shunt regulator, and the voltage command voltage signal of the upper limit voltage is inputted to the switching control circuit. Since a voltage command represented by the voltage command voltage signal of the upper limit voltage is a voltage less than the protection determination voltage of the output overvoltage protection circuit, the output voltage becomes less than the protection determination voltage. Therefore, the DC power conversion of the power converter is continued without being stopped by the output overvoltage protection circuit. When some fault should occur in the output overvoltage protection circuit, even if abnormalities occur in the voltage command voltage signal, since the voltage command voltage signal is upper-limited to the upper limit voltage by the voltage command upper limit circuit, the output voltage can be prevented from being in the output overvoltage state, without depending on the output overvoltage protection circuit.

DETAILED DESCRIPTION OF THE EMBODIMENTS

Embodiment 1

Figure 1:
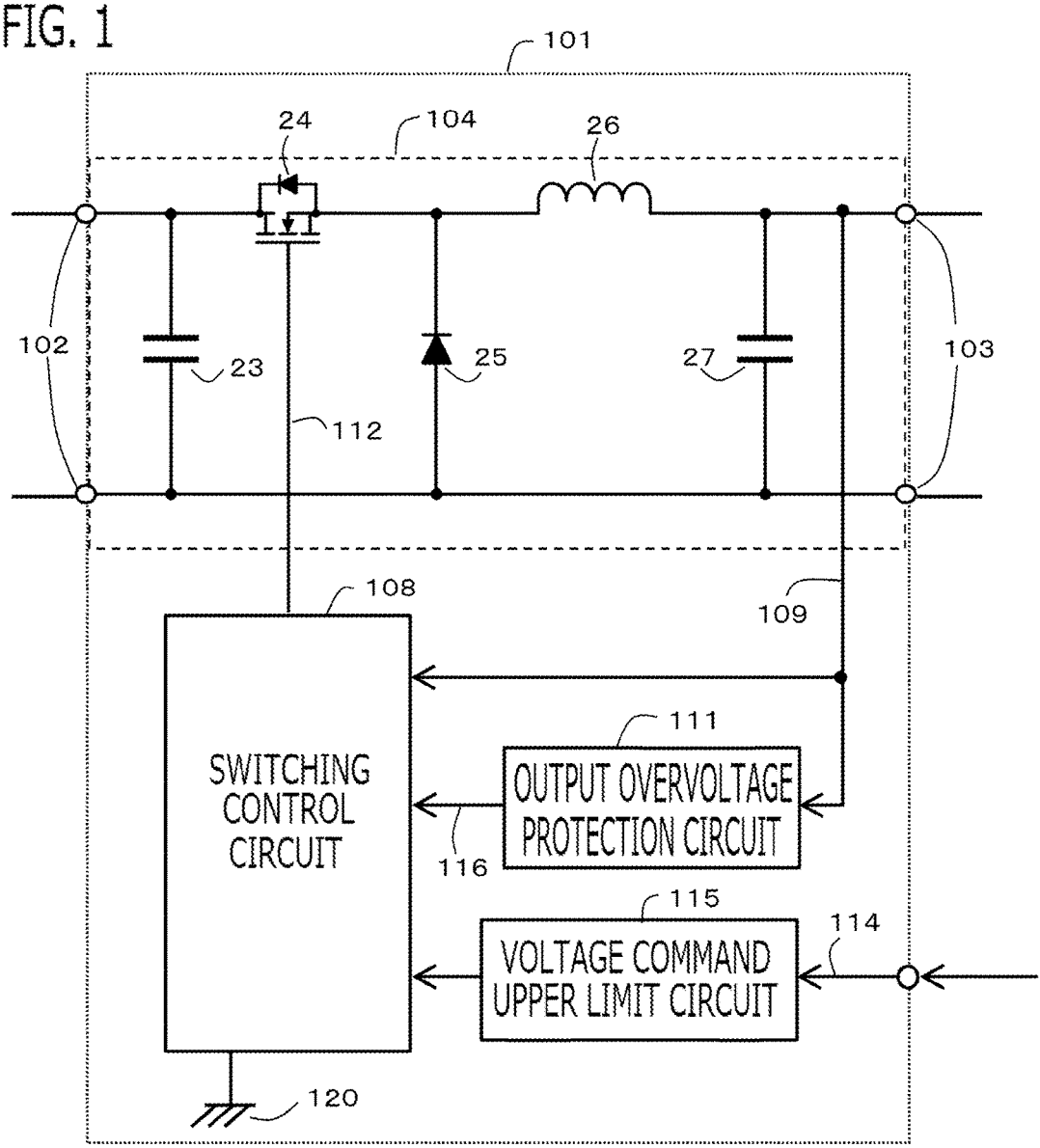
FIG. 1 is a schematic circuit configuration diagram of the power converter according to Embodiment 1.

A power converter 101 according to Embodiment 1 will be explained with reference to drawings. FIG. 1 is a schematic circuit configuration diagram of the power converter 101 according to the present embodiment. The power converter 101 is provided with a power conversion circuit 104, a switching control circuit 108, an output overvoltage protection circuit 111, and a voltage command upper limit circuit 115.

<Power Conversion Circuit 104>

The power conversion circuit 104 converts DC electric power from the input terminal 102 to the output terminal 103. The power conversion circuit 104 is provided with a switching device 24. In the present embodiment, the power conversion circuit 104 is a step-down chopper circuit which steps down the DC voltage of the input terminal 102 to the DC voltage of the output terminal 103.

The power conversion circuit 104 is provided with a switching device 24 provided on a positive pole wire which connects between a positive electrode of the input terminal 102 and a positive electrodes of the output terminal 103; a smoothing reactor 26 provided on the positive pole wire at the output terminal 103 side than the switching device 24; a reflux diode 25 connected between a part of the positive pole wire between the switching device 24 and the smoothing reactor 26, and a negative pole wire which connects between a negative electrode of the input terminal 102 and a negative electrode of the output terminal 103; an input smoothing capacitor 23 connected between the positive electrode and the negative electrode of the input terminal 102; and an output smoothing capacitor 27 connected between the positive electrode and the negative electrode of the output terminal 103.

The input smoothing capacitor 23 is used to absorb ripple of input voltage and input current generated by on/off operation of the switching device 24. A film capacitor is used for the input smoothing capacitor 23, for example. A MOSFET (Metal Oxide Semiconductor Field Effect Transistor) is used for the switching device 24. Other kinds of switching device such as an IGBT (Insulated Gate Bipolar Transistor) in which a free wheel diode is connected in reversely parallel may be used for the switching device 24.

The reflux diode 25 becomes a current route when the switching device 24 is turned off. The smoothing reactor 26 absorbs ripple of output voltage and output current generated by on/off operation of the switching device 24. The output smoothing capacitor 27 is used to absorb the ripple of output voltage and output current generated by on/off operation of the switching device 24. A film capacitor is used for the output smoothing capacitor 27, for example.

<Switching Control Circuit 108>

A voltage signal (hereinafter, referred to as a voltage command voltage signal) which represents a voltage command is inputted to the switching control circuit 108 via an electric wire 114 (hereinafter, referred to as a voltage command signal wire 114). The voltage command voltage signal is inputted to an input terminal of the voltage command signal wire 114 from the outside of the power converter 101. For example, the voltage command voltage signal is a voltage signal within a preliminarily set voltage range (for example, 0 to 5V). And, a value obtained by multiplying a conversion gain to the voltage command voltage signal corresponds to the actual voltage command. The switching control circuit 108 is connected to a ground 120.

A signal representing a output voltage which is the DC voltage of the output terminal 103 is inputted to the switching control circuit 108 via an electric wire 109 (hereinafter, referred to as an output voltage signal wire 109). In the present embodiment, the output voltage signal wire 109 is connected to the positive electrode of the output terminal 103, and inputs a voltage of the positive electrode of the output terminal 103 to the switching control circuit 108.

The switching control circuit 108 controls on/off of the switching device 24 so that the output voltage which is the DC voltage of the output terminal 103 approaches the voltage command represented by the voltage command voltage signal which was inputted to the switching control circuit 108. The switching control circuit 108 generates a gate signal which turns on and off the switching device 24 by PWM (Pulse Width Modulation) control. The gate signal is inputted to the gate terminal of the switching device 24 via a wire 112. The switching control circuit 108 performs feedback control that increases the ON period of the switching device 24, when the output voltage is lower than the voltage command, and decrease the ON period of the switching device 24, when the output voltage is higher than the voltage command.

When an output inhibition command signal is inputted from the output overvoltage protection circuit 111 described below via an electric wire 116 (hereinafter, output inhibition signal wire 116), the switching control circuit 108 stops the on/off control of the switching device 24, in order to stop the DC power conversion of the power conversion circuit 104. In the present embodiment, the switching control circuit 108 turns off the switching device 24.

The switching control circuit 108 is provided with a processing circuit which performs the on/off control of the switching device 24. The processing circuit of the switching control circuit 108 may consist of an analog electronic circuit, such as a comparator, an operational amplifier, and a differential amplifying circuit; may consist of a digital electronic circuit, such as an IC (Integrated Circuit); or may consist of both of the digital electronic circuit and the analog electronic circuit.

<Output Overvoltage Protection Circuit 111>

When the output voltage exceeds a preliminarily set protection determination voltage, the output overvoltage protection circuit 111 transmits the output inhibition command signal for commanding stop of DC power conversion to the switching control circuit 108 via the output inhibition signal wire 116. The signal representing the output voltage is also inputted to the output overvoltage protection circuit 111 via the output voltage signal wire 109. The output overvoltage protection circuit 111 compares the output voltage with the protection determination voltage; and turns on (High) the output inhibition command signal, when the output voltage becomes larger than the protection determination voltage, and turns off (Low) the output inhibition command signal, when the output voltage becomes smaller than the protection determination voltage. The output overvoltage protection circuit 111 may consist of analog circuits such as a comparator and an operational amplifier, or may consist of digital circuits such as an IC (Integrated Circuit).

<Voltage Command Upper Limit Circuit 115>

First, the necessity of the voltage command upper limit circuit 115 will be explained. As one of malfunctions of the power converter 101, there is a phenomenon being in the state where the output voltage exceeds a determined voltage, that is, an output overvoltage state. A plurality of causes, such as failure of the switching control circuit 108, disconnection of the output voltage signal wire 109, and failure of apart which detects the output voltage, can be considered as causes that the output voltage of the power converter 101 becomes in the overvoltage state. But, as one of causes, there is a cause that a voltage signal corresponding to the output overvoltage state is given to the voltage command voltage signal.

Although the voltage command voltage signal is transmitted from the outside of the power converter 101, for example, when a power short-circuit failure occurs in the voltage command signal wire 114, the voltage command voltage signal may become a voltage signal corresponding to the output overvoltage state. In this case, the output voltage of the power converter 101 becomes in the overvoltage state. Since the output overvoltage protection circuit 111 outputs the output inhibition command signal and the switching control circuit 108 stops DC power conversion at this time, the output voltage will drop and operation of the electric load to which the output voltage is supplied will stop. Therefore, when there is no abnormality in the power converter 101 itself, but there is abnormality in the voltage command voltage signal inputted into the power converter 101, it is desired not to stop the DC power conversion of the power converter 101.

When some fault should occur in the output overvoltage protection circuit 111, even if the voltage command voltage signal transmitted from the outside becomes a voltage signal corresponding to the output overvoltage state and the output voltage becomes in the overvoltage state, the output inhibition command signal is not transmitted, and the overvoltage is supplied to the electric load. Therefore, when there is abnormality in the voltage command voltage signal, it is desired to prevent the output voltage from being in the output overvoltage state, without depending on the output overvoltage protection circuit 111.

Figure 2:
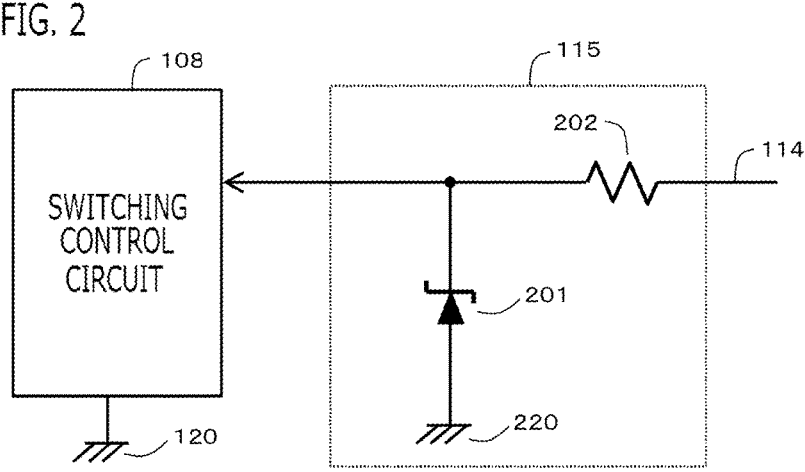
FIG. 2 is a circuit diagram of the voltage command upper limit circuit according to Embodiment 1.

Then, in the present embodiment, the power converter 101 is provided with a voltage command upper limit circuit 115. The voltage command upper limit circuit 115 upper-limits the voltage command voltage signal which is a voltage signal inputted into the switching control circuit 108 by a preliminarily set upper limit voltage. As shown in FIG. 2, the voltage command upper limit circuit 115 is provided with a Zener diode 201 which is connected between a ground 220 and the voltage command signal wire 114 which is a wire inputting the voltage command voltage signal to the switching control circuit 108. The Zener diode 201 upper-limits the voltage command voltage signal by an upper limit voltage corresponding to a Zener voltage (breakdown voltage) of the Zener diode 201. A voltage command represented by the upper limit voltage is set to a voltage less than the protection determination voltage of the output overvoltage protection circuit 111.

According to this configuration, when the voltage command voltage signal becomes excessive due to power short-circuit failure and the like, the voltage command voltage signal is upper-limited to the upper limit voltage corresponding to the Zener voltage by the Zener diode 201, and the voltage command voltage signal of the upper limit voltage is inputted to the switching control circuit 108. Since a voltage command represented by the voltage command voltage signal of the upper limit voltage is a voltage less than the protection determination voltage of the output overvoltage protection circuit 111, the output voltage becomes less than the protection determination voltage. Therefore, the DC power conversion of the power converter 101 is continued without being stopped by the output overvoltage protection circuit 111.

When some fault should occur in the output overvoltage protection circuit 111, even if abnormalities occur in the voltage command voltage signal, since the voltage command voltage signal is upper-limited to the upper limit voltage by the voltage command upper limit circuit 115, the output voltage can be prevented from being in the output overvoltage state, without depending on the output overvoltage protection circuit 111.

When the voltage command voltage signal does not exceed the upper limit voltage corresponding to Zener voltage, the voltage command voltage signal is directly transmitted to the switching control circuit 108, and there is no possibility of giving an adverse influence on the DC voltage conversion. This is a characteristic realized by using the Zener diode 201 for the voltage command upper limit circuit 115.

By providing the output overvoltage protection circuit 111, it is not necessary to redesign hardware of the switching control circuit 108 which consists of the IC and the like, and cost increase of the switching control circuit 108 can be suppressed. The output overvoltage protection circuit 111 is realized by the inexpensive Zener diode 201. Therefore, cost increase of the whole power converter 101 can be suppressed.

A configuration of the voltage command upper limit circuit 115 according to the present embodiment will be explained in detail. The cathode side of the Zener diode 201 is connected to the voltage command signal wire 114, and the anode side is connected to the ground 220. When a voltage of the voltage command signal wire 114 connected to the cathode side of the Zener diode 201 reaches the Zener voltage (breakdown voltage) of the Zener diode 201, current (Zener current) flows to the anode from the cathode of the Zener diode 201, and the voltage of the voltage command signal wire 114 is upper-limited to the Zener voltage. Instead of the Zener diode 201, a shunt regulator which imitates the function of the Zener diode may be used. The shunt regulator upper-limits the voltage command voltage signal by an upper limit voltage corresponding to a shunt voltage of the shunt regulator.

A resistance 202 is provided on the voltage command signal wire 114 at the input terminal side rather than the connection node of the Zener diode 201 and the voltage command signal wire 114. When a voltage of the connection node of the Zener diode 201 and the voltage command signal wire 114 exceeded the Zener voltage and the Zener current flows, since equivalent current flows also into the resistance 202, a potential difference is generated between both ends of the resistance 202, and the voltage of the connection node drops to the Zener voltage. In the present embodiment, the connection node of the Zener diode 201 and the voltage command signal wire 114 is connected to the switching control circuit 108, a voltage signal inputted to the switching control circuit 108 is upper-limited by the Zener voltage (upper limit voltage), and a voltage command represented by the Zener voltage is set to a voltage less than the protection determination voltage. For example, when a voltage command voltage signal corresponding to the protection determination voltage is 3V, the Zener voltage (upper limit voltage) is set to less than 3V.

A characteristic of the Zener voltage of Zener diode 201 is high-precision, and a temperature characteristic is also small. Therefore, the voltage command represented by the Zener voltage can be set to a voltage just less than the protection determination voltage. Therefore, an output voltage range of the power converter 101 can be set wider.

In the present embodiment, the power conversion circuit 104 is the step-down chopper circuit as shown in FIG. 1; however, as long as it is a conversion circuit which converts DC electric power from the input terminal 102 to the output terminal 103, and is provided with a switching device, it may be any kind of conversion circuit.

For example, the power conversion circuit 104 may be a step-up chopper circuit, may be a step-up and step-down chopper circuit which can step up and step down voltage, and may be an insulated type conversion circuit provided with a transformer.

In the present embodiment, the voltage command voltage signal is transmitted from the outside of the power converter 101; however, a device (for example, microcomputer and the like) which generates the voltage command voltage signal may be disposed in a case integrated with the power converter 101, and the voltage command voltage signal may be transmitted from the inside of the power converter 101.

Embodiment 2

Figure 3:
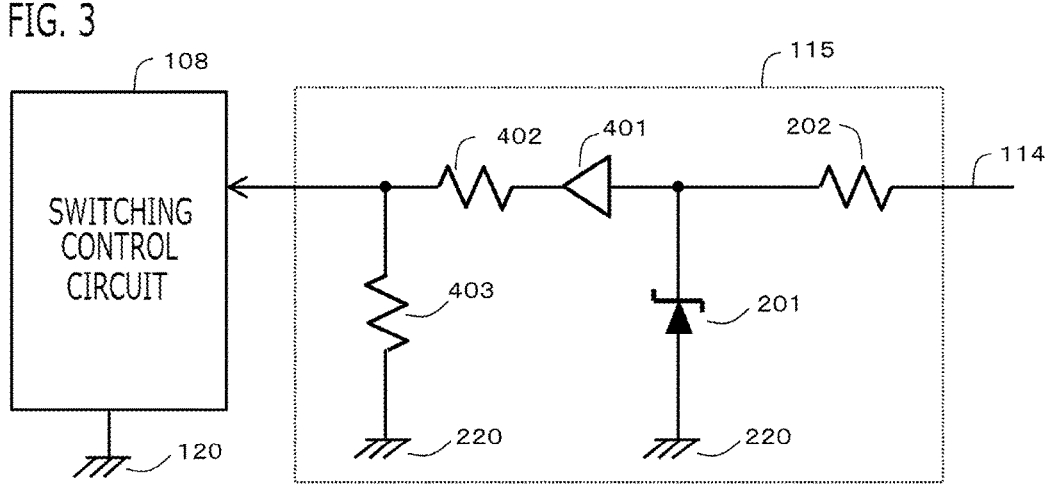
FIG. 3 is a circuit diagram of the voltage command upper limit circuit according to Embodiment 2.

Next, the power converter 101 according to Embodiment 2 will be explained. The explanation for constituent parts the same as those in Embodiment 1 will be omitted. The basic configuration of the power converter 101 according to the present embodiment is the same as that of Embodiment 1; however, Embodiment 2 is different from Embodiment 1 in configuration of the voltage command upper limit circuit 115. FIG. 3 shows a circuit diagram of the voltage command upper limit circuit 115 according to the present embodiment.

In the present embodiment, as is the case with Embodiment 1, the voltage command upper limit circuit 115 upper-limits the voltage command voltage signal which is a voltage signal inputted into the switching control circuit 108 by a preliminarily set upper limit voltage. The voltage command upper limit circuit 115 is provided with the Zener diode 201 which is connected between the ground 220 and the voltage command signal wire 114 which is a wire inputting the voltage command voltage signal to the switching control circuit 108. The Zener diode 201 upper-limits the voltage command voltage signal by the upper limit voltage corresponding to the Zener voltage (breakdown voltage) of the Zener diode 201. A voltage command represented by the upper limit voltage is set to a voltage less than the protection determination voltage of the output overvoltage protection circuit 111.

In the present embodiment, unlike Embodiment 1, the voltage command upper limit circuit 115 is provided with a plurality of voltage dividing resistances (in this example, a first voltage dividing resistance 402, a second voltage dividing resistance 403). the plurality of voltage dividing resistances divide a voltage of the connection node between the voltage command signal wire 114 and the Zener diode 201, and input a voltage divided by the plurality of voltage dividing resistances as a final voltage command voltage signal, into the switching control circuit 108. The upper limit voltage becomes a voltage obtained by dividing the Zener voltage by the plurality of voltage dividing resistances.

According to this configuration, the upper limit voltage which upper-limits the voltage command voltage signal can be set to a different voltage from the Zener voltage. The upper limit voltage can be changed by changing a resistance value of each voltage dividing resistance and changing a voltage division ratio, without changing the Zener voltage of Zener diode 201. A setting flexibility of the upper limit voltage can be enhanced.

The first voltage dividing resistance 402 and the second voltage dividing resistance 403 are connected in series between the grounds 220 and the connection node of the voltage command signal wire 114 and the Zener diode 201. The connection node of the first voltage dividing resistance 402 and the second voltage dividing resistance 403 is connected to the switching control circuit 108. A voltage of the connection node of the voltage command signal wire 114 and the Zener diode 201 is divided by the ratio (voltage division ratio) of a resistance value of the first voltage dividing resistance 402 and a resistance value of the second voltage dividing resistance 403.

A voltage signal inputted into the switching control circuit 108 is upper-limited by an upper limit voltage which is a voltage obtained by multiplying the voltage division ratio to the Zener voltage. A voltage command represented by the upper limit voltage is set to a voltage less than the protection determination voltage.

In the present embodiment, a buffer 401 is provided between the connection node of the voltage command signal wire 114 and the Zener diode 201, and the first voltage dividing resistance 402. The buffer 401 is provided in order to lower an output impedance of a voltage before voltage dividing. Generally, the buffer 401 is an operational amplifier in which the output voltage is equal to the input voltage.

Even in the present embodiment, instead of the Zener diode 201, a shunt regulator which imitates the function of the Zener diode may be used. The shunt regulator upper-limits a voltage signal inputted into the switching control circuit 108 by an upper limit voltage which becomes a voltage obtained by multiplying the voltage division ratio to the shunt voltage of the shunt regulator.

Various modifications and alterations of this disclosure will be apparent to those skilled in the art without departing from the scope and spirit of this disclosure, and it should be understood that this is not limited to the illustrative embodiments set forth herein.

What is claimed is:

1. A power converter comprising:
   a power conversion circuit provided with a switching device for converting DC power from an input terminal to an output terminal;
   a switching control circuit that controls on/off of the switching device so that a DC voltage of the output terminal approaches a voltage command represented by a voltage signal inputted to the switching control circuit;
   an output overvoltage protection circuit that transmits an output inhibition command signal for commanding stop of DC power conversion to the switching control circuit, when the DC voltage of the output terminal exceeds a protection determination voltage which is preliminarily set; and
   a voltage command upper limit circuit that upper-limits the voltage signal, which is inputted to the switching control circuit, by an upper limit voltage which is preliminarily set,
   wherein the voltage command upper limit circuit is provided with one of a Zener diode and a shunt regulator connected between a ground and a voltage command signal wire which is a wire inputting the voltage signal to the switching control circuit,
   wherein the one of the Zener diode and the shunt regulator upper-limits the voltage signal, which is inputted to the switching control circuit, by the upper limit voltage corresponding to a Zener voltage or a shunt voltage, respectively, and
   wherein the voltage command, which is represented by the voltage signal upper-limited by the upper limit voltage, is set to a voltage less than the protection determination voltage.

2. The power converter according to claim 1, wherein the voltage command upper limit circuit is provided with a plurality of voltage dividing resistances which divide a voltage of a connection node between the voltage command signal wire and the one of the Zener diode and the shunt regulator, and inputs a voltage divided by the plurality of voltage dividing resistances as the voltage signal, to the switching control circuit.

* * * * *